(12) United States Patent
Furukawa et al.

(10) Patent No.: US 8,451,373 B2
(45) Date of Patent: May 28, 2013

(54) FRAME RATE CONVERTER AND DISPLAY APPARATUS EQUIPPED THEREWITH

(75) Inventors: Riichi Furukawa, Gifu (JP); Satoshi Otowa, Gifu (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 327 days.

(21) Appl. No.: 12/847,613

(22) Filed: Jul. 30, 2010

(65) Prior Publication Data
US 2011/0025910 A1 Feb. 3, 2011

(30) Foreign Application Priority Data
Jul. 31, 2009 (JP) ................................. 2009-179816

(51) Int. Cl.
*H04N 5/14* (2006.01)
(52) U.S. Cl.
USPC ........................................................ 348/441
(58) Field of Classification Search
USPC .................... 348/441, 448, 452, 458, 459
See application file for complete search history.

(56) References Cited

U.S. PATENT DOCUMENTS

| | | | | |
|---|---|---|---|---|
| 5,835,636 A * | 11/1998 | Auld | ............................ | 382/233 |
| 6,466,624 B1 * | 10/2002 | Fogg | ........................ | 375/240.27 |
| 6,704,357 B1 * | 3/2004 | Ketcham | ................... | 375/240.01 |
| 6,735,249 B1 * | 5/2004 | Karczewicz et al. | ......... | 375/240 |
| 6,809,777 B2 * | 10/2004 | Oka et al. | ....................... | 348/571 |
| 6,829,302 B2 * | 12/2004 | Morishita et al. | ........ | 375/240.22 |
| 7,149,251 B2 * | 12/2006 | Karczewicz et al. | .... | 375/240.16 |
| 7,474,696 B2 * | 1/2009 | Washino | ................... | 375/240.01 |
| 7,483,058 B1 * | 1/2009 | Frank et al. | ................ | 348/222.1 |
| 7,965,303 B2 * | 6/2011 | Hanaoka et al. | .............. | 345/606 |
| 8,077,923 B2 * | 12/2011 | Tsubaki et al. | ................ | 382/107 |
| 8,228,427 B2 * | 7/2012 | Mori et al. | ..................... | 348/441 |
| 2010/0091185 A1 * | 4/2010 | Ueno et al. | ..................... | 348/452 |
| 2010/0118185 A1 * | 5/2010 | Furukawa et al. | ............ | 348/452 |

FOREIGN PATENT DOCUMENTS

| | | |
|---|---|---|
| JP | 2009-021868 | 1/2009 |
| JP | 2009-071842 | 4/2009 |
| JP | 2009-239335 | 10/2009 |

\* cited by examiner

*Primary Examiner* — Paulos M Natnael
(74) *Attorney, Agent, or Firm* — McDermott Will & Emery LLP

(57) ABSTRACT

An input unit writes, into a memory unit, frames successively input from the outside. An interpolated frame generating unit reads multiple original frames from the memory unit, generates an interpolated frame between the original frames, and writes the interpolated frame into the memory unit. An output unit retrieves original frames and an interpolated frame from the memory unit and outputs to the outside the frames in the order in which the frames are to be displayed. The input unit, interpolated frame generating unit, and output unit operate in parallel to perform pipeline processing. Operation timing of each of the input unit and the interpolated frame generating unit is determined so that the timing at which the input unit writes an original frame into the memory unit differs from the timing at which the interpolated frame generating unit writes an interpolated frame into the memory unit.

6 Claims, 8 Drawing Sheets

FRAME RATE CONVERTER AND DISPLAY APPARATUS EQUIPPED THEREWITH

This application is based upon and claims the benefit of priority from the prior Japanese Patent Application No. 2009-179816, filed Jul. 31, 2009, the entire contents of which are incorporated herein by reference.

BACKGROUND OF THE INVENTION

1. Field of the Invention

The present invention relates to a frame rate converter for converting a frame rate by inserting an interpolated frame, and a display apparatus equipped with the frame rate converter.

2. Description of the Related Art

In recent years, there have been put into practical use the methods for increasing the number of frames of moving images using frame interpolation techniques so as to generate more fluid moving images causing less persistence of vision. For example, there has been already put to practical use a technique for doubling or quadrupling the frame rate of 60 frames per second (60 Hz) of a moving image, thereby displaying the moving image at the converted frame rate, i.e., 120 Hz or 240 Hz. To generate an interpolated frame, a method using a motion vector between frames has been attracting attention.

Meanwhile, one-segment broadcasting started in April 2006 in Japan. One-segment broadcasting is narrowband broadcasting mainly intended for cellular phones and other mobile devices. Since images are generally transmitted at 15 frames per second (15 Hz) in one-segment broadcasting, it is highly required to increase the number of frames.

SUMMARY OF THE INVENTION

In order to implement a frame rate converting process, in which interpolated frames are inserted to increase the number of frames, using hardware processing, frame data need be written into or read out from memory or each of multiple logic circuits that cooperatively perform the frame rate converting process. Also, such a frame rate converting process need be performed in real time, and a method is effective therefor in which the multiple logic circuits mentioned above perform pipeline processing in parallel. However, when such a method is employed, access concentration on the memory is occur, thereby the load on the memory is likely to increase.

A frame rate converter of an embodiment of the present invention comprises: an input unit configured to write, into a memory unit, frames successively input from the outside; an interpolated frame generating unit configured to retrieve a plurality of original frames from the memory unit, generate an interpolated frame between the original frames, and write the interpolated frame into the memory unit; and an output unit configured to retrieve original frames and an interpolated frame from the memory unit and output to the outside the frames in the order in which the frames are to be displayed. The input unit, interpolated frame generating unit, and output unit operate in parallel to perform pipeline processing, and operation timing of each of the input unit and the interpolated frame generating unit is determined so that the timing at which the input unit writes an original frame into the memory unit differs from the timing at which the interpolated frame generating unit writes an interpolated frame into the memory unit.

Another embodiment of the present invention is a display apparatus. The apparatus comprises the frame rate converter described above and a display unit configured to display an image of which the frame rate has been converted by the frame rate converter.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
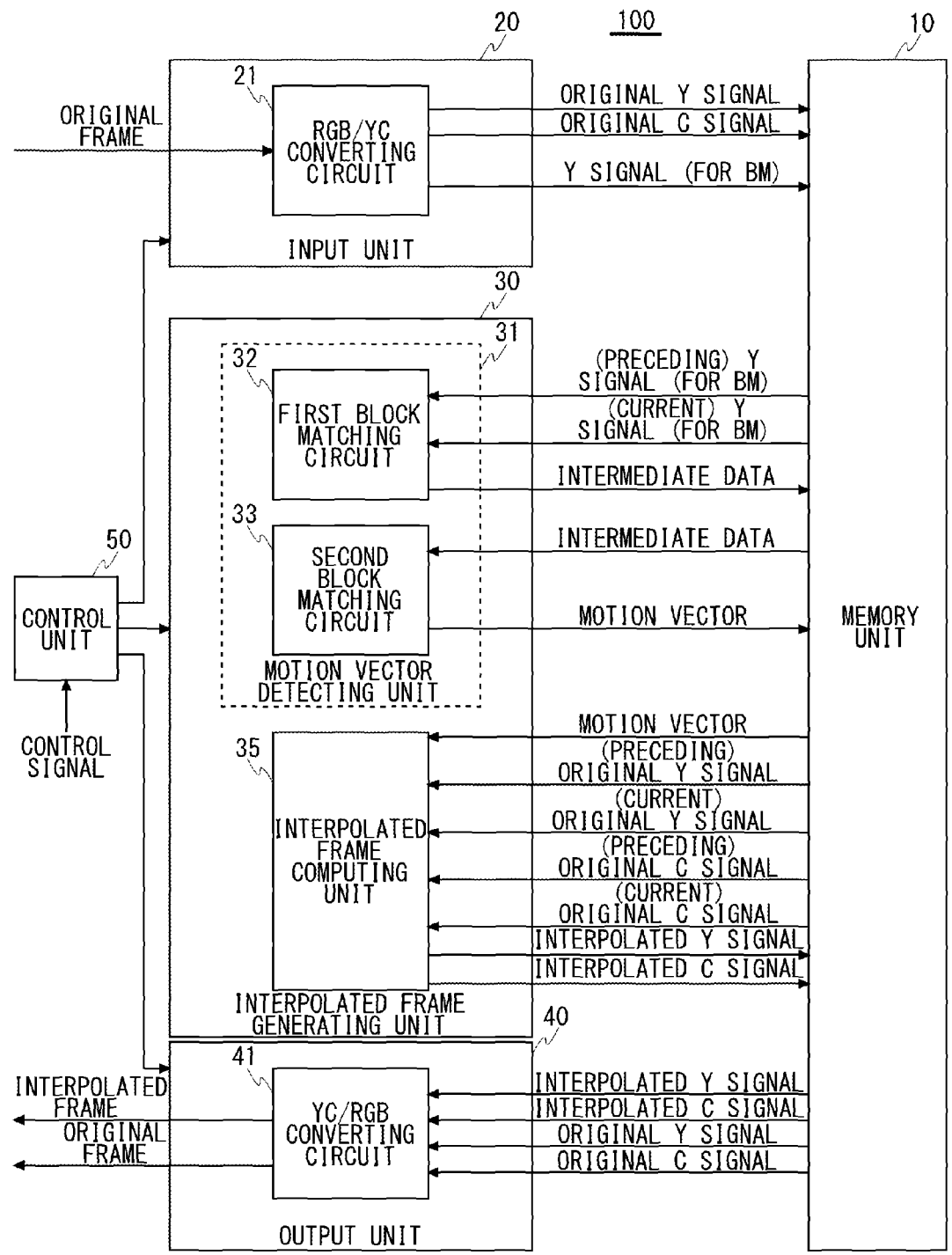
FIG. 1 is a diagram that shows a configuration of a frame rate converter according to an embodiment of the present invention.

FIG. 1 is a diagram that shows a configuration of a frame rate converter 100 according to an embodiment of the present invention. The frame rate converter 100 increases the number of frames of an input moving image and outputs the frames. For example, the frame rate converter 100 doubles or quadruples the number of frames of a moving image and outputs the frames. The frame rate converter 100 comprises a memory unit 10, an input unit 20, an interpolated frame generating unit 30, an output unit 40, and a control unit 50. The input unit 20, interpolated frame generating unit 30, and output unit 40 operate in parallel to perform pipeline processing.

The memory unit 10 may be configured with an SDRAM (Synchronous Dynamic Random Access Memory). Also, the memory unit 10 may be provided outside the frame rate converter 100. Each of the input unit 20, interpolated frame generating unit 30, and output unit 40 may be configured with a logic circuit formed by combining various computing units and registers. The logic circuit includes a work area provided by an SRAM (Static Random Access Memory) or the like. The control unit 50 may be configured with a logic circuit or a DSP (Digital Signal Processor).

The memory unit 10 temporarily stores a frame. More specifically, the memory unit stores an original frame input from the outside and an interpolated frame generated by the interpolated frame generating unit 30. The memory unit 10 also stores intermediate data that occurs during the operation for generating an interpolated frame (such as a motion vector).

The input unit 20 writes, into the memory unit 10, frames constituting a moving image input from the outside. In the present embodiment, it is assumed that frame data input to the input unit 20 is defined by three-primary-color (R, G, B) signals. The input unit 20 of the present embodiment includes an RGB/YC converting circuit 21. The RGB/YC converting circuit 21 converts input three-primary-color (R, G, B) signals into a luminance (Y) signal and color difference (Cb, Cr) signals and writes such signals into the memory unit 10. Accordingly, the data amount can be reduced. For instance, three-primary-color (R, G, B) signals with the ratio 4:4:4 may be converted into a luminance (Y) signal and color difference (Cb, Cr) signals with the ratio 4:2:2.

Hereinafter, a luminance (Y) signal is simply referred to as a Y signal, while two color difference (Cb, Cr) signals are collectively referred to as C signals. Also, Y signals and C signals of an original frame are referred to as original Y signals and original C signals, while Y signals and C signals of an interpolated frame are referred to as interpolated Y signals and interpolated C signals.

In the present embodiment, the RGB/YC converting circuit 21 generates a Y signal for block matching and writes the signal into the memory unit 10. For example, the circuit generates a Y signal with increased resolution through sub-pixel interpolation (half pixel precision or quarter pixel precision, for example). Using such a Y signal, sub-pixel motion compensation is enabled, thereby detecting a higher precision motion vector. Sub-pixel interpolation can be performed through filter processing using a 6-tap FIR filter or the like.

The interpolated frame generating unit 30 reads two original frames from the memory unit 10 to generate an interpolated frame therebetween and writes the generated frame into the memory unit 10. The interpolated frame generating unit 30 includes a motion vector detecting unit 31 and an interpolated frame computing unit 35.

The motion vector detecting unit 31 detects a block-based or pixel-based motion vector between two original frames. In the present embodiment, a pixel-based motion vector is detected by two-step block matching.

The motion vector detecting unit 31 includes a first block matching circuit 32 and a second block matching circuit 33. The first block matching circuit 32 retrieves, from the memory unit 10, Y signals for block matching of the current frame and its preceding frame, which are to be the two original frames set forth above. The first block matching circuit 32 then divides the preceding frame into multiple blocks (8×8 or 16×16 macroblocks, for example) and searches the current frame for a block that matches one of the multiple blocks or of which the difference from one of the multiple blocks is minimal.

For instance, the sum of absolute intensity differences or the sum of squared intensity differences between pixels included in a target block in the preceding frame and pixels included in a candidate block in the current frame is computed, in which each of such differences is computed between a pixel in the target block and a pixel in the candidate block of which the positions within a block correspond to each other; then, a candidate block for which the computed sum is minimum is specified as the optimal prediction block in the current frame. Alternatively, each pixel included in a target block in the preceding frame is compared to a pixel at the corresponding position in a candidate block in the current frame, and a candidate block including the largest number of pixels that substantially match the corresponding pixels in the target block may be specified as the optimal prediction block in the current frame.

The first block matching circuit 32 computes motion vectors between each block in the preceding frame and the corresponding optimal prediction block in the current frame. Accordingly, block-based motion vectors can be detected.

The first block matching circuit 32 then writes into the memory unit 10 the computation results as intermediate data.

The second block matching circuit 33 retrieves from the memory unit 10 the intermediate data written by the first block matching circuit 32, and computes a motion vector between a pixel in each block in the preceding frame and a pixel at the corresponding position in the corresponding optimal prediction block in the current frame, in which the pixel values of these pixels do not substantially match each other. For example, a pixel area is specified in each block in the preceding frame so as to include a pixel of which the pixel value does not substantially match that of a pixel at the corresponding position in the corresponding optimal prediction block, and, using a method similar to the aforementioned method, the current frame is searched for an area that matches the pixel area or of which the difference from the pixel area is minimal. Accordingly, pixel-based motion vectors between the preceding frame and the current frame can be detected. The second block matching circuit 33 then writes the pixel-based motion vectors into the memory unit 10.

The interpolated frame computing unit 35 specifies a pixel-based motion vector that passes through a pixel within an interpolated frame and defines the pixel in the interpolated frame by synthesizing the pixel in the preceding frame and the pixel in the current frame, which correspond to the initial point and the terminal point of the motion vector, respectively. In the following, a method for defining a pixel in an interpolated frame will be described with reference to FIGS. 2 and 3.

Figure 2:
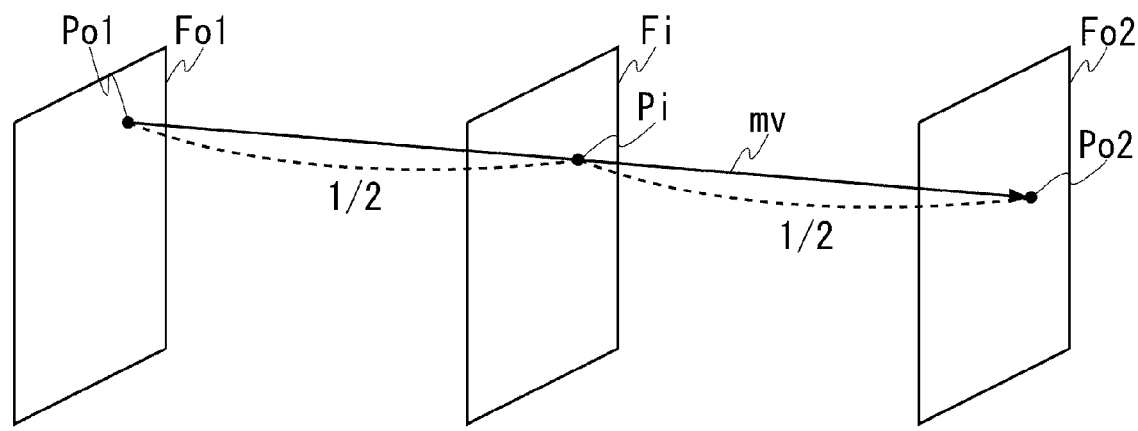
FIG. 2 is a diagram that shows a generating principle of an interpolated frame (double frame rate)

FIG. 2 is a diagram that shows a generating principle of an interpolated frame (double frame rate). To double the frame rate, one interpolated frame Fi need be inserted between the first original frame Fo1 and the second original frame Fo2. The interpolated frame Fi is inserted at the time position that bisects the time period between the first original frame Fo1 and second original frame Fo2.

A pixel Pi in the interpolated frame Fi is defined by synthesizing the pixel Po1 in the first original frame Fo1 and the pixel Po2 in the second original frame Fo2, which correspond to the initial point and the terminal point of the motion vector my that passes through the pixel Pi. For example, the pixel values of the pixels Po1 and Po2 may be averaged to compute the pixel value of the pixel Pi in the interpolated frame Fi.

If the motion vector my passing through the pixel Pi in the interpolated frame Fi can be accurately obtained, the pixel Po1 in the first original frame Fo1, which corresponds to the initial point of the motion vector mv, may be directly provided as the pixel Pi in the interpolated frame Fi. However, if the motion vector my is incorrectly detected, since only one pixel Po1 can be referred to, higher noise will be likely to occur. Accordingly, in the present embodiment, both the pixel Po1 in the first original frame Fo1 and the pixel Po2 in the second original frame Fo2 are referred to.

When there is no motion vector passing through a target pixel in the interpolated frame Fi, the following processing may be performed, for example: a pixel spatially interpolated from its peripheral pixels in the interpolated frame Fi may be defined as the target pixel; or a pixel obtained by synthesizing a pixel in the first original frame Fo1 and a pixel in the second original frame Fo2, the position of each of which is identical to the position of the target pixel in the interpolated frame Fi, may be defined as the target pixel.

Figure 3:
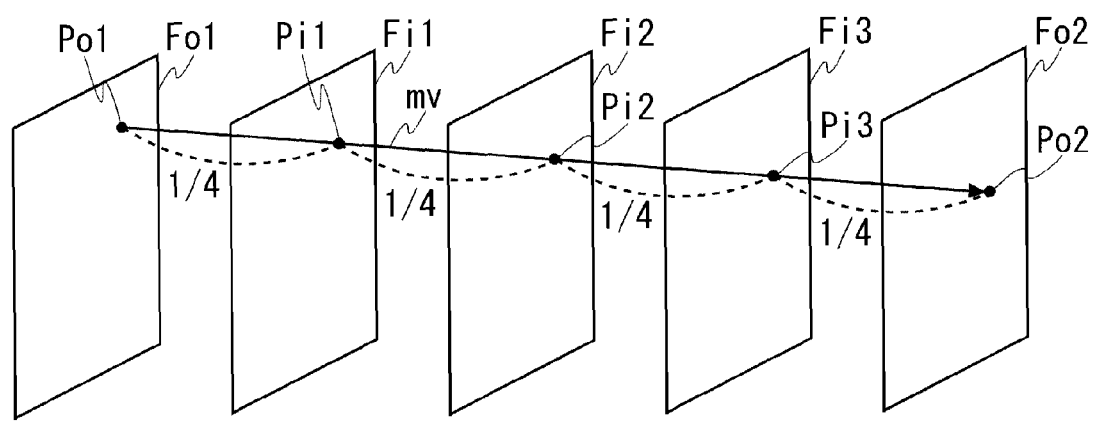
FIG. 3 is a diagram that shows a generating principle of interpolated frames (quadruple frame rate)

FIG. 3 is a diagram that shows a generating principle of interpolated frames (quadruple frame rate). To quadruple the frame rate, three interpolated frames (a first interpolated frame Fi1, a second interpolated frame Fi2, and a third interpolated frame Fi3) need be inserted between the first original frame Fo1 and the second original frame Fo2. The first interpolated frame Fi1, second interpolated frame Fi2, and third interpolated frame Fi3 are inserted respectively at the time positions that quadrisect the time period between the first original frame Fo1 and second original frame Fo2.

A pixel Pi1 in the first interpolated frame Fi1 is defined by synthesizing the pixel Po1 in the first original frame Fo1 and the pixel Po2 in the second original frame Fo2, which correspond to the initial point and the terminal point of the motion vector my that passes through the pixel Pi1. For example, a weighted average of the pixel values of the pixels Po1 and Po2 may be computed as the pixel value of the pixel Pi1 in the first interpolated frame Fi1. That is, three quarters of the pixel value of the pixel Po1 and a quarter of the pixel value of the pixel Po2 are added together.

A pixel Pi2 in the second interpolated frame Fi2 can be defined in the same way as the pixel Pi in the interpolated frame Fi shown in FIG. 2 is defined. A pixel Pi3 in the third interpolated frame Fi3 is also defined by synthesizing the pixel Po1 in the first original frame Fo1 and the pixel Po2 in the second original frame Fo2. For example, a weighted average of the pixel values of the pixels Po1 and Po2 may be computed as the pixel value of the pixel Pi3 in the third interpolated frame Fi3. That is, a quarter of the pixel value of the pixel Po1 and three quarters of the pixel value of the pixel Po2 are added together.

The description now returns to FIG. 1, and the interpolated frame computing unit 35 retrieves, from the memory unit 10, original Y signals and original C signals of the preceding frame, original Y signals and original C signals of the current frame, and motion vectors between the preceding frame and the current frame. The interpolated frame computing unit 35 then generates an interpolated frame using the method described above and writes interpolated Y signals and interpolated C signals thereof into the memory unit 10.

The output unit 40 retrieves original frames and an interpolated frame from the memory unit 10 and outputs to the outside the frames in the order in which they are to be displayed. The output unit 40 of the present embodiment includes a YC/RGB converting circuit 41. The YC/RGB converting circuit 41 retrieves interpolated Y signals and interpolated C signals from the memory unit 10 to convert them into three-primary-color (R, G, B) signals, and outputs the resulting signals as an interpolated frame to the outside (to a display panel, for example). The YC/RGB converting circuit 41 also retrieves original Y signals and original C signals from the memory unit 10 to convert them into three-primary-color (R, G, B) signals, and outputs the resulting signals as an original frame to the outside.

The control unit 50 provides overall control of the whole frame rate converter 100. For example, the control unit 50 switches the mode of the frame rate converter 100 according to a control signal from the outside (such as a main control unit 300 in FIG. 6, which will be described later). The control unit 50 may select either of the double frame rate mode and quadruple frame rate mode and set the input unit 20, interpolated frame generating unit 30, and output unit 40 into the selected mode, for example.

There will now be described the operation performed by the frame rate converter 100 according to the embodiment. The input unit 20, interpolated frame generating unit 30, and output unit 40 operate with a period shorter than the period with which a frame to be processed is input to the input unit 20. The frame to be processed means a frame to be actually used without being discarded so as to be displayed or to be referred to when an interpolated frame is generated. In the following, an example will be described in which frames are input to the input unit 20 at 15 Hz, while each of the input unit 20, first block matching circuit 32, second block matching circuit 33, interpolated frame computing unit 35, and output unit 40 operates at 60 Hz.

In the present embodiment, operation timing of each of the input unit 20 and interpolated frame generating unit 30 is determined so that the timing at which the input unit 20 writes an original frame into the memory unit 10 differs from the timing at which the interpolated frame generating unit 30 writes an interpolated frame into the memory unit 10. In the following, specific operation timing of each of the input unit 20, interpolated frame generating unit 30, and output unit 40 will be described with reference to FIGS. 4 and 5.

First, exemplary operation 1 will be described. Basic operation in the exemplary operation 1 will be as follows. The interpolated frame generating unit 30 completes an interpolated frame generating process within the period between the termination of the input period of a target frame, in which the target frame is input to the input unit 20 and written into the memory unit 10, and the initiation of the input period of the next frame. In the interpolated frame generating process, at least the target frame is retrieved from the memory unit 10, an interpolated frame is generated with reference to at least the target frame, and the interpolated frame is written into the memory unit 10. This interpolated frame is to be inserted anterior to the target frame. The interpolated frame generating unit 30 may generate the interpolated frame with reference to the target frame and the preceding frame, the target frame and a frame anterior to the preceding frame, or the target frame and multiple frames further anterior thereto.

Figure 4:
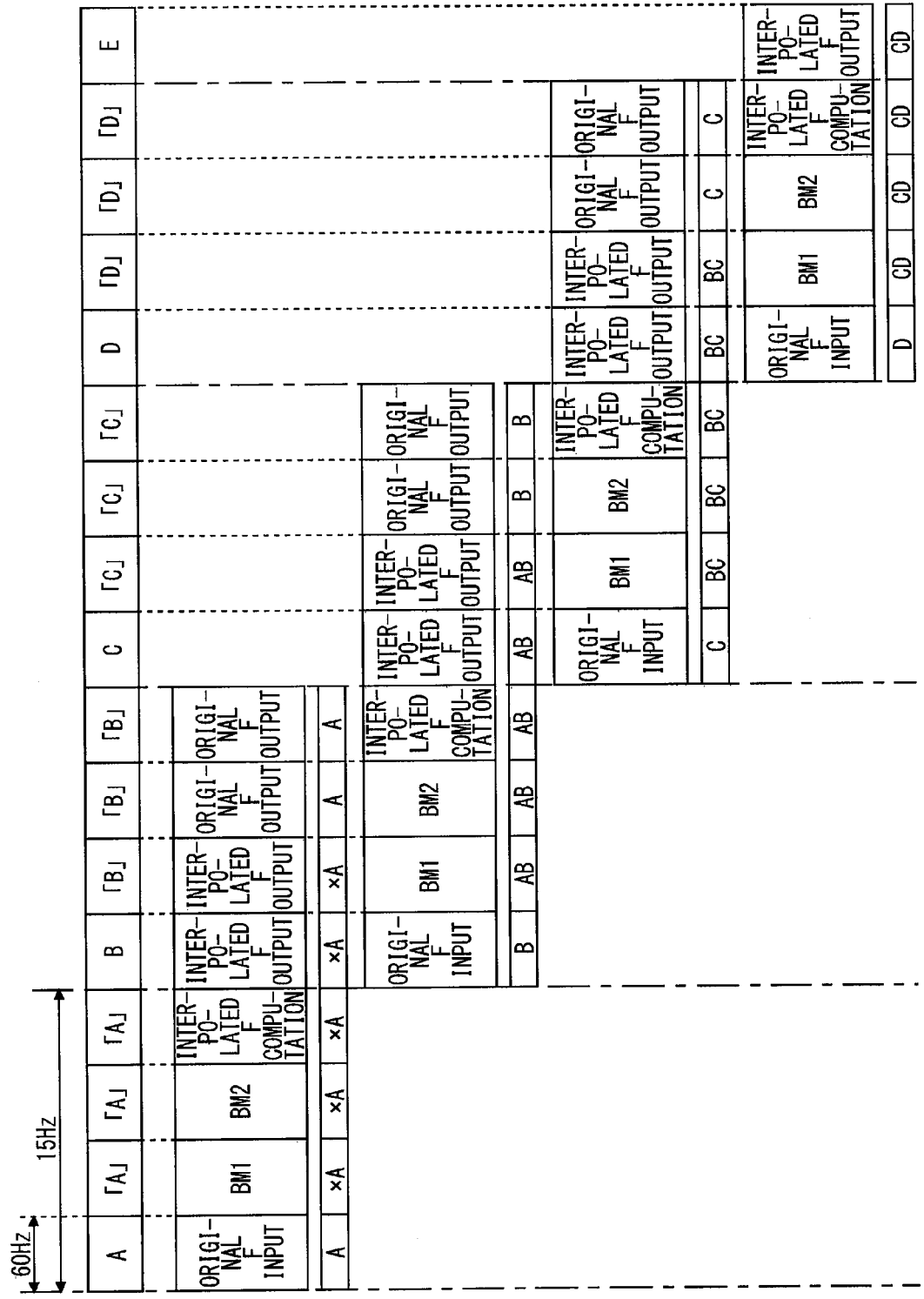
FIG. 4 is a timing chart that shows exemplary operation 1 of the frame rate converter according to the embodiment.

FIG. 4 is a timing chart that shows the exemplary operation 1 of the frame rate converter 100 according to the embodiment. The figure shows an example in which frames are received at 15 Hz through one-segment broadcasting, and the number of the frames is quadrupled through simple duplication processing performed by a frame rate converting unit 330 shown in FIG. 6, which will be described later, so as to be input to the frame rate converter 100 according to the embodiment. The frame rate converting unit 330 in FIG. 6 quadruples the number of frames in order to enable displaying on a display panel driven at 60 Hz.

In FIG. 4, four identical frames A are successively input before four identical frames B are successively input, and, thereafter, four identical frames C are successively input, followed by frames D, frames E, and so on. In the exemplary operation 1, an interpolated frame is generated between the frame A and frame B, between the frame B and frame C, between the frame C and the frame D, etc. Consequently, the frame rate of the input moving image is doubled.

The input unit 20 retains one frame among four identical frames successively input and discards the other three frames. In the embodiment, the input unit 20 performs input processing of the first frame and discards the remaining three frames.

The interpolated frame generating unit 30 completes the processing of retrieving from the memory unit 10 a target frame (A) and the preceding frame (x) to generate an interpolated frame (xA) therebetween and writing the interpolated frame into the memory unit 10, within the period between the termination of the input period of the target frame (A) {original F input (A)}, in which the target frame (A) is input to the input unit 20 and written into the memory unit 10, and the initiation of the input period of the next frame (B) {original F input (B)}. In other words, the period of the first matching performed by the first block matching circuit 32 {BM1(xA)}, the period of the second matching performed by the second block matching circuit 33 {BM2(xA)}, and the period of the computation performed by the interpolated frame computing unit 35 {interpolated F computation (xA)} are set to fall within the period between the termination of the input period of the target frame (A) {original F input (A)} and the initiation of the input period of the next frame (B) {original F input (B)}.

The output unit 40 retrieves, from the memory unit 10, the interpolated frame (xA) and the target frame (A) in this order and outputs the frames to the outside, within the period between the initiation of the input period of the next frame (B) {original F input (B)} and the initiation of the input period of the subsequent frame (C) {original F input (C)}. In the embodiment, the identical two interpolated frames (xA) are output before the identical two target frames (A) are output.

The period in which the input unit 20 inputs the next frame (B) {original F input (B)}, the period in which the first block matching circuit 32 performs the first matching {BM1(AB)}, the period in which the second block matching circuit 33 performs the second matching {BM2(AB)}, and the period in which the interpolated frame computing unit 35 performs the computation {interpolated F computation (AB)} are specified so as to be in parallel with the periods in which the output unit 40 outputs the interpolated frames (xA) and the target frames (A) {interpolated F output (xA), interpolated F output (xA), original F output (A), and original F output (A)}. Thus, pipeline processing is enabled. Thereafter, the subsequent frames C, D, E, etc. will be processed in the same way.

Next, exemplary operation 2 will be described. Basic operation in the exemplary operation 2 will be as follows. If the interpolated frame generating unit 30 performs an interpolated frame generating process longer than the period between the termination of the input period of a target frame, in which the target frame is input to the input unit 20 and written into the memory unit 10, and the initiation of the input period of the next frame, the interpolated frame generating unit 30 will suspend the interpolated frame generating process during the input period of the next frame. In the interpolated frame generating process, at least the target frame is retrieved from the memory unit 10, an interpolated frame is generated with reference to at least the target frame, and the interpolated frame is written into the memory unit 10.

Figure 5:
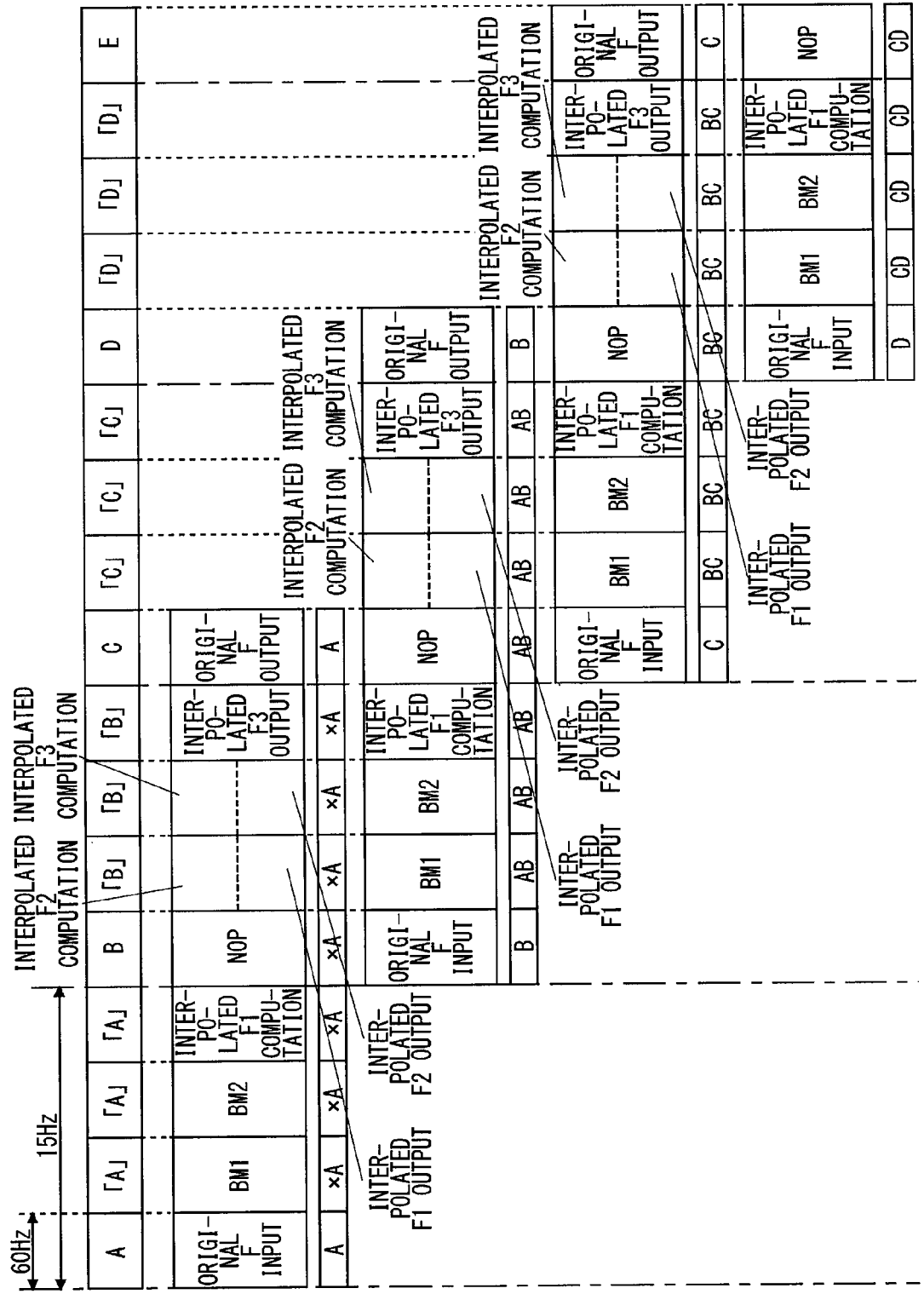
FIG. 5 is a timing chart that shows exemplary operation 2 of the frame rate converter according to the embodiment.

FIG. 5 is a timing chart that shows the exemplary operation 2 of the frame rate converter 100 according to the embodiment. The exemplary operation 2 is defined on the same premise as the exemplary operation 1. In the exemplary operation 2, three interpolated frames are generated in stages between the frame A and frame B, between the frame B and frame C, between the frame C and the frame D, etc. Consequently, the frame rate of the input moving image is quadrupled.

In the exemplary operation 2, the interpolated frame generating unit 30 performs the interpolated frame generating process of retrieving from the memory unit 10 a target frame (A) and the preceding frame (x) to generate an interpolated frame (xA) therebetween and writing the interpolated frame into the memory unit 10, longer than the period between the termination of the input period of the target frame (A) {original F input (A)}, in which the target frame (A) is input to the input unit 20 and written into the memory unit 10, and the initiation of the input period of the next frame (B) {original F input (B)}. In this case, the interpolated frame generating unit 30 suspends the interpolated frame generating process during the input period of the next frame (B) {original F input (B)}.

When at least one of the three interpolated frames (xA) is stored in the memory unit 10, the output unit 40 retrieves from the memory unit 10 the three interpolated frames (xA) and the target frame (A) one by one in this order and outputs the frames to the outside.

A specific description will now be given. In order to generate three interpolated frames (xA) in stages between the target frame (A) and the preceding frame (x), the interpolated frame generating unit 30 repeats the interpolated frame generating process three times after the termination of the input period of the target frame (A) {original F input (A)}. In this case, the interpolated frame generating unit 30 suspends the interpolated frame generating processes during the input period of the next frame (B) {original F input (B)}.

More specifically, the first block matching circuit 32 performs the first matching process within the unit operation period {BM1(xA)}, which is subsequent to the input period of the target frame (A) {original F input (A)}. The second block matching circuit 33 then performs the second matching process within the next unit operation period {BM2(xA)}. Subsequently, the interpolated frame computing unit 35 performs computation of the first interpolated frame (xA) within the subsequent unit operation period {interpolated F1 computation (xA)}. Although the interpolated frame generating process terminates at this point in the exemplary operation 1, the process further continues in the exemplary operation 2. Since the subsequent unit operation period on the process line starting from the input process of the target frame (A) coincides with the input period of the next frame (B) {original F input (B)}, NOP (no operation) is inserted into the unit operation period.

Within the subsequent unit operation period {interpolated F2 computation/interpolated F1 output (xA)}, the interpolated frame computing unit 35 performs computation of the second interpolated frame (xA) and, concurrently, the output unit 40 retrieves the first interpolated frame (xA) from the memory unit 10 and outputs the frame to the outside. Then, within the unit operation period subsequent thereto {interpolated F3 computation/interpolated F2 output (xA)}, the interpolated frame computing unit 35 performs computation of the third interpolated frame (xA) and, concurrently, the output unit 40 retrieves the second interpolated frame (xA) from the memory unit 10 and outputs the frame to the outside. Thereafter, within the unit operation period subsequent thereto {interpolated F3 output (xA)}, the output unit 40 retrieves the third interpolated frame (xA) from the memory unit 10 and outputs the frame to the outside.

In this way, the timing at which the output unit 40 outputs each of the four frames in the exemplary operation 2 is shifted forward by one unit operation period from the corresponding timing in the exemplary operation 1. Accordingly, among the input unit 20, interpolated frame generating unit 30, and output unit 40, two units may be set to perform processing while one unit is set to suspend the process, during a frame rate converting process.

As described above, when a frame rate converting process, in which interpolated frames are inserted to increase the number of frames, is implemented using hardware processing according to the present embodiment, the load on the memory can be reduced while real-time processing is ensured. More specifically, the input unit 20, interpolated frame generating unit 30, and output unit 40 are allowed to operate in parallel to perform pipeline processing, thereby ensuring real-time processing.

Also, since operation timing of each of the input unit 20 and interpolated frame generating unit 30 is determined so that the timing at which the input unit 20 writes an original frame into the memory unit 10 differs from the timing at which the interpolated frame generating unit 30 writes an interpolated frame into the memory unit 10, the maximum load on the memory unit 10 can be reduced.

Technically, the amount of accessed data in the memory unit 10 increases during an input period for the input unit 20 (original F input) and a computation period for the interpolated frame computing unit 35 (interpolated F computation). The input unit 20 need write both Y signals and C signals of an original frame into the memory unit 10. Also, the interpolated frame computing unit 35 need retrieve, from the memory unit 10, Y signals and C signals of both the preceding frame and the current frame, and motion vectors of those two frames. Further, the interpolated frame computing unit 35 need write Y signals and C signals of an interpolated frame into the memory unit 10.

On the other hand, the amount of accessed data in the memory unit 10 is relatively small during a first matching period for the first block matching circuit 32 (BM1) and a second matching period for the second block matching circuit 33 (BM2). It is because the signals transmitted between the memory unit 10 and the first block matching circuit 32 or second block matching circuit 33 are only Y signals and motion vectors, and C signals are not transmitted therebetween.

Accordingly, by determining an input period for the input unit 20 (original F input) and a computation period for the interpolated frame computing unit 35 (interpolated F computation) so that the periods are not scheduled in the same period, an increase in the amount of accessed data in the memory unit 10 can be prevented. Such an input period (original F input) and a computation period (interpolated F computation) are set not to coincide with each other in both the exemplary operation 1 and exemplary operation 2 set forth above. In the exemplary operation 2, NOP is inserted to avoid the coincidence of the input period (original F input) and computation period (interpolated F computation).

In the exemplary operation 2, the periods in which the interpolated frame computing unit 35 computes the second and third interpolated frames (interpolated F2 computation and interpolated F3 computation) are set to coincide with the periods in which the output unit 40 outputs the first and second interpolated frames (interpolated F1 output and interpolated F2 output), respectively. Also, the period in which the output unit 40 outputs the third interpolated frame (interpolated F3 output) and the period in which the interpolated frame computing unit 35 computes the next first interpolated frame (interpolated F1 computation) are set to coincide with each other. Further, the period in which the output unit 40 outputs the original frame (original F output) and the period in which the input unit 20 inputs the original frame subsequent to the next original frame (original F input) are set to coincide with each other.

Accordingly, if first matching processes performed by the first block matching circuit 32 and second matching processes performed by the second block matching circuit 33 are ignored in the exemplary operation 2, it is considered that an input process by the input unit 20 or a computation process by the interpolated frame computing unit 35 is performed concurrently with an output process by the output unit 40 within each unit operation period. This averages the load on the memory unit 10 and also averages the entire load on the input unit 20, interpolated frame computing unit 35, and output unit 40.

Also, in the exemplary operation 1, an input process by the input unit 20, a computation process by the interpolated frame computing unit 35, and an output process by the output unit 40 are set to be not concurrently performed altogether within a unit operation period. Accordingly, the entire load on the input unit 20, interpolated frame computing unit 35, and output unit 40 can be averaged also in the exemplary operation 1.

Figure 6:
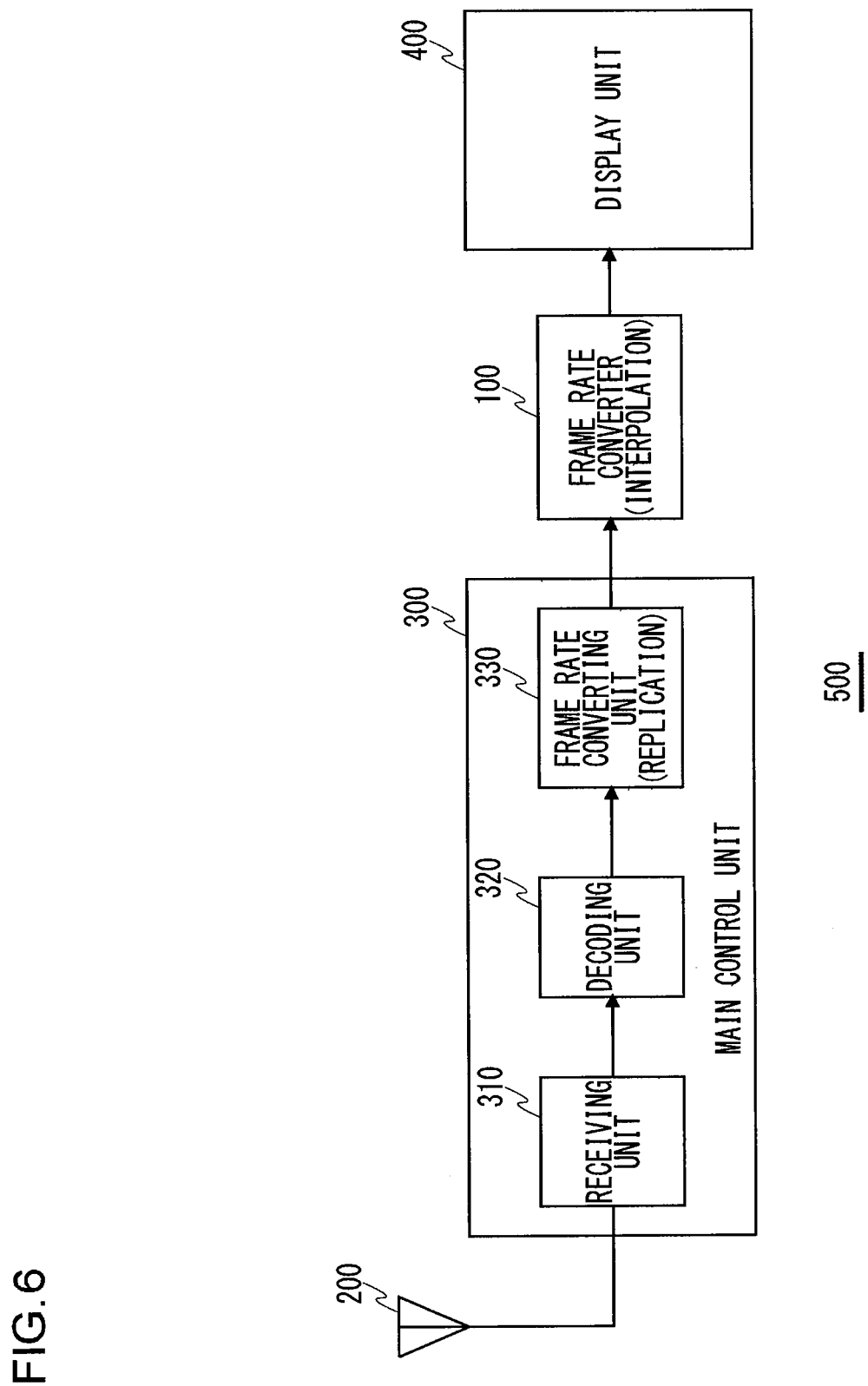
FIG. 6 is a diagram that shows a display apparatus equipped with the frame rate converter according to the embodiment.

FIG. 6 is a diagram that shows a display apparatus 500 equipped with the frame rate converter 100 according to the embodiment. The display apparatus 500 is a device provided with a function to receive one-segment broadcasting and display and reproduce programs. For example, the display apparatus 500 may be a device for receiving and reproducing only for one-segment broadcasting, or may be a cellular phone, a PDA, a portable music player, an electronic dictionary, or a car navigation device provided with such a function.

The display apparatus 500 comprises an antenna 200, a main control unit 300, the frame rate converter 100, and a display unit 400. The main control unit 300 includes a receiving unit 310, a decoding unit 320, and a frame rate converting unit 330. The receiving unit 310 receives one-segment broadcasting via the antenna 200 and demodulates a signal for a selected channel to output the signal to the decoding unit 320.

The decoding unit 320 decodes encoded data input from the receiving unit 310. For encoding of images for one-segment broadcasting, the AVC/H.264 standard is employed. The decoding unit 320 outputs a decoded frame to the frame rate converting unit 330. Although resolution converting is performed using a scaler, not illustrated, before a decoded frame is input to the frame rate converting unit 330, the process is omitted here as little attention is focused thereon.

The frame rate converting unit 330 simply duplicates an input frame to increase the number of frames. In the embodiment, each frame of a moving image given at 15 Hz is duplicated three times to quadruple the number of frames, there by converting the moving image given at 15 Hz to a moving image given at 60 Hz. Instead of simple duplication, at least one frame to be added may be generated by simplified synthesis between two successive original frames. For instance, the upper area of one original frame and the lower area of the other original frame may be spatially synthesized.

The frame rate converter 100 doubles or quadruples the frame rate of a moving image input from the frame rate converting unit 330 using the method described in the embodiment above. The display unit 400 displays the moving image thus converted by the frame rate converter 100.

Thus, by equipping the display apparatus 500, which receives one-segment broadcasting and displays and reproduces programs, with the frame rate converter 100 according to the embodiment, the image quality of One-Seg images can be improved. Although FIG. 6 shows an example in which the frame rate of a One-Seg image is converted by using the existing main control unit 300 and the frame rate converter 100 added thereto, the frame rate converter 100 may be provided within the main control unit 300 from the beginning instead of the frame rate converting unit 330.

The present invention has been described with reference to embodiments. The embodiments are intended to be illustrative only, and it will be obvious to those skilled in the art that various modifications to constituting elements or processes could be developed and that such modifications also fall within the scope of the present invention.

For instance, the aforementioned embodiment describes a method for detecting a pixel-based motion vector by two-step block matching. Alternatively, using a block-based motion vector obtained by one block matching, a motion vector passing through each pixel within an interpolated frame may be acquired. Also, a pixel-based motion vector may be detected using a gradient method, instead of block matching.

The aforementioned embodiment describes an example of doubling or quadrupling the frame rate of a moving image for one-segment broadcasting. However, the application of the frame rate converter 100 according to the present invention is not limited thereto, and the frame rate converter 100 may be applied to frame rate conversion of various kinds of moving images. Particularly, it is effective to use the frame rate converter 100 for a moving image of which the frame rate is low, such as a moving image captured by a camera with low specifications. For example, the frame rate converter 100 is applicable to frame rate conversion of a moving image of which the frame rate is less than 15 Hz.

FIGS. 4 and 5 show examples in which block matching is performed for two periods (60 Hz is considered as a unit period here). However, the block matching may be performed for less than two periods employing a more simplified method, or may be performed for over two periods employing a method for higher accuracy.

Figure 7:
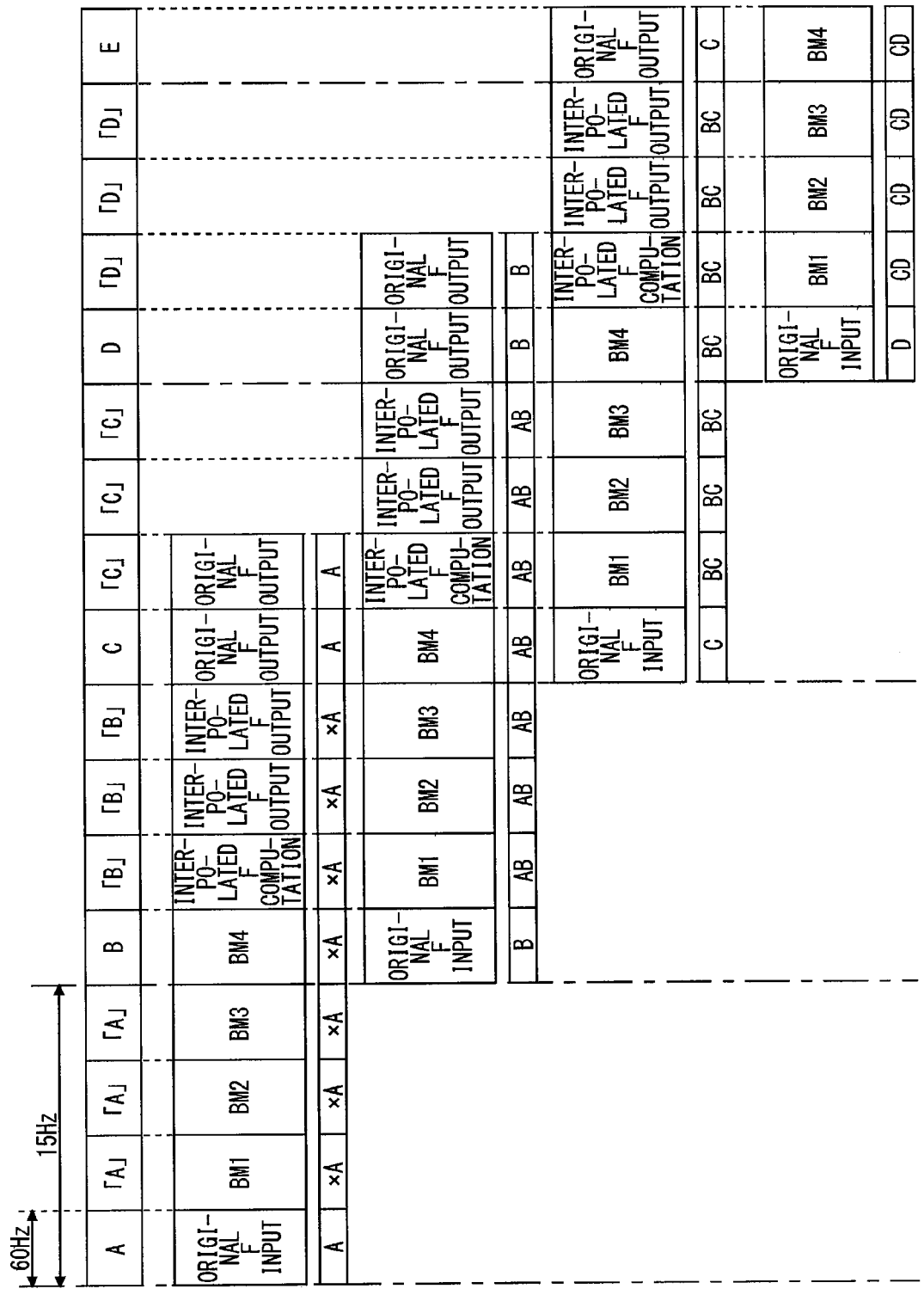
FIG. 7 is a timing chart that shows a modification 1 of the exemplary operation 1 of the frame rate converter according to the embodiment.

FIG. 7 is a timing chart that shows a modification 1 of the exemplary operation 1 of the frame rate converter 100 according to the embodiment. In comparison with the timing chart of FIG. 4, the period of block matching is changed from two periods to four periods in the timing chart of FIG. 7. An input period for the input unit 20 (original F input) and a computation period for the interpolated frame computing unit 35 (interpolated F computation) are set to be not scheduled in the same period also in the modification 1.

Figure 8:
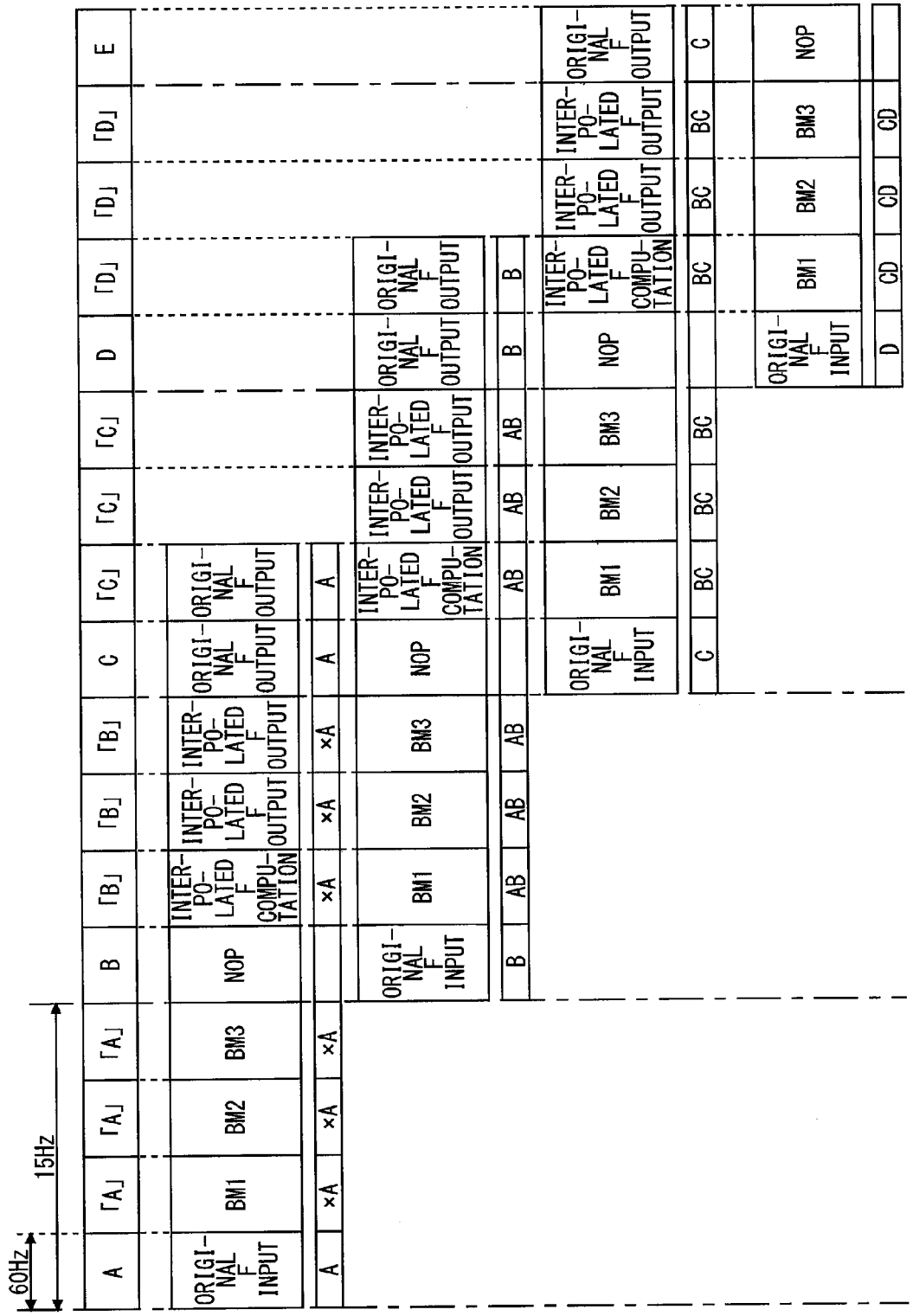
FIG. 8 is a timing chart that shows a modification 2 of the exemplary operation 1 of the frame rate converter according to the embodiment.

FIG. 8 is a timing chart that shows a modification 2 of the exemplary operation 1 of the frame rate converter 100 according to the embodiment. In comparison with the timing chart of FIG. 4, the period of block matching is changed from two periods to three periods and NOP is inserted to the subsequent period in the timing chart of FIG. 8. If block matching is performed for three periods, an input period for the input unit 20 (original F input) and a computation period for the interpolated frame computing unit 35 (interpolated F computation) will coincide with each other. Accordingly, by inserting NOP between block matching periods (BM1-3) and an interpolated frame computation period (interpolated F computation), an input period for the input unit 20 (original F input) and a computation period for the interpolated frame computing unit 35 (interpolated F computation) can be set to be not scheduled in the same period also in the modification 2.

Also, FIGS. 4 and 5 show examples in which processing of computing one interpolated frame is performed for one period (60 Hz is considered as a unit period). However, such processing may be performed for less than one period employing a more simplified method, or may be performed for over two periods employing a method for higher accuracy.

What is claimed is:

1. A frame rate converter, comprising:
    an input unit configured to write, into a memory unit, frames successively input from the outside;
    an interpolated frame generating unit configured to retrieve a plurality of original frames from the memory unit, generate an interpolated frame between the original frames, and write the interpolated frame into the memory unit; and
    an output unit configured to retrieve original frames and an interpolated frame from the memory unit and output to the outside the frames in the order in which the frames are to be displayed, wherein:
    the input unit, the interpolated frame generating unit, and the output unit operate in parallel to perform pipeline processing,
    operation timing of each of the input unit and the interpolated frame generating unit is determined so that the timing at which the input unit writes an original frame into the memory unit differs from the timing at which the interpolated frame generating unit writes an interpolated frame into the memory unit, and
    within the period between the termination of the input period of a target frame, in which the target frame is input to the input unit and written into the memory unit, and the initiation of the input period of the next frame, the interpolated frame generating unit completes the processing of retrieving at least the target frame, generating the interpolated frame with reference to at least the target frame, and writing the interpolated frame.

2. The frame rate converter of claim 1, wherein the interpolated frame generating unit suspends an interpolated frame generating process during the input period of the next frame.

3. The frame rate converter of claim 1, wherein the interpolated frame generating unit generates a plurality of interpolated frames in stages between the original frames.

4. A frame rate converter, comprising:
    an input unit configured to write, into a memory unit, frames successively input from the outside;
    an interpolated frame generating unit configured to retrieve a plurality of original frames from the memory unit, generate an interpolated frame between the original frames, and write the interpolated frame into the memory unit; and
    an output unit configured to retrieve original frames and an interpolated frame from the memory unit and output to the outside the frames in the order in which the frames are to be displayed, wherein:
    the input unit, the interpolated frame generating unit, and the output unit operate in parallel to perform pipeline processing,
    operation timing of each of the input unit and the interpolated frame generating unit is determined so that the timing at which the input unit writes an original frame into the memory unit differs from the timing at which the interpolated frame generating unit writes an interpolated frame into the memory unit, and
    the number of frames to be input to the input unit is increased by duplication before the frames are input to the frame rate converter.

5. The frame rate converter of claim 4, wherein the number of frames input to the input unit equals the number of frames output from the output unit.

6. A display apparatus, comprising:
    the frame rate converter of claim 1; and
    a display unit configured to display an image of which the frame rate has been converted by the frame rate converter.

* * * * *